(12) United States Patent
Gottschling et al.

(10) Patent No.: US 7,090,763 B2
(45) Date of Patent: Aug. 15, 2006

(54) PROCESS FOR THE PRODUCTION OF SHAPED ARTICLES OF NIOBIUM OR TANTALUM BY ELECTROCHEMICAL ETCHING

(75) Inventors: Marianne Gottschling, Goslar (DE); Josua Löffelholz, Langelsheim (DE); Mathias Albert, Dresden (DE); Günter Sadowski, Radebeul (DE)

(73) Assignee: H. C. Starck GmbH, Goslar (DE)

( * ) Notice: Subject to any disclaimer, the term of this patent is extended or adjusted under 35 U.S.C. 154(b) by 239 days.

(21) Appl. No.: 10/741,870

(22) Filed: Dec. 19, 2003

(65) Prior Publication Data

US 2004/0178081 A1 Sep. 16, 2004

(30) Foreign Application Priority Data

Dec. 20, 2002 (DE) ................. 102 59 934

(51) Int. Cl.
*C25F 3/008* (2006.01)
(52) U.S. Cl. .................... 205/667; 205/684
(58) Field of Classification Search ........ 205/667, 205/684
See application file for complete search history.

(56) References Cited

U.S. PATENT DOCUMENTS

| | | | | |
|---|---|---|---|---|
| 2,775,553 A | * | 12/1956 | Kahan ................. | 205/674 |
| 3,314,867 A | | 4/1967 | Gore et al. ............ | 204/32 |
| 3,689,288 A | | 9/1972 | Diepers et al. ........ | 204/140.5 |
| 4,266,008 A | * | 5/1981 | Kampwirth et al. ..... | 430/318 |
| 5,690,807 A | * | 11/1997 | Clark et al. ......... | 205/655 |
| 2002/0088709 A1 | * | 7/2002 | Hongo et al. ......... | 204/223 |
| 2002/0108861 A1 | * | 8/2002 | Emesh et al. ........ | 205/81 |
| 2003/0087528 A1 | | 5/2003 | Kruwinus et al. ...... | 438/697 |

FOREIGN PATENT DOCUMENTS

| | | | |
|---|---|---|---|
| JP | 56-81680 | | 7/1981 |
| SU | 662624 | * | 5/1979 |
| SU | 876808 | * | 11/1979 |

OTHER PUBLICATIONS

Red'kin et al, Electrochemical Etching of a Niobium Film through a Tin Nanomask Formed by AFM Tip-Induced Local Oxidation, Mar. 2003, MAIK Nauka Interperiodica, vol. 32, No. 2, pp. 88-90.*
Petzow, Metallographic Etching, 1999, ASM International, pp. 80-89.*
Jenny et al., Electrolytic Etching of Dense Tantalum, 1961, Journal of the Electrochemical Society, vol. 108, pp. 442-445.*
Shtan'ko et al., Influence of Anodic Polarization on the Process of Anodic Dissolution of Tantalum, 1978, Vopr. Khim. Tekhnol., 80, p. 7-10.*
M. Köhler in Ätzverfahren für die Mikrotechnik [Etching methods for microengineering], Wiley-VCH-Verlag (month unavailable) 1998, p. 306 , "Nb—Niob".

(Continued)

*Primary Examiner*—Roy King
*Assistant Examiner*—Michael P. Alexander
(74) *Attorney, Agent, or Firm*—Joseph C. Gil

(57) ABSTRACT

Process for the production of shaped articles of niobium or tantalum by electrochemical etching of a niobium or tantalum sheet covered by a structured photoresist mask in an aqueous solution containing hydrofluoric acid, the etching being effected under electrochemical conditions under which strong noise is superposed on the etching current and the etching solution contains a water-soluble polymer.

7 Claims, 1 Drawing Sheet

OTHER PUBLICATIONS

G. Petzow, in Metallographisches, keramographisches, plastographisches Ätzen [Metallographic, Ceramographic, plastographic etching], Gebr. Borntraeger Verlag, 6th edition, (month unavailable) 1994, p. 99, "Refraktämetalle".

Database WPI Section Ch, Week 198005 Derwent Publications Ltd., London, GB; XP002274520 & SU 662 624 A (As Latv Inorg Chem) 18. May 18, 1979.

Database CA 'Online! Chemical Abstracts Service, Columbus, Ohio, US; Kadaner, L. I. et al: "Solution for electrochemical polishing of niobium articles" XP002274518 gefunden im STN Database accession No. 96:76531 CA & Database WPI Section Ch, Week 198235 Derwent Publications Ltd., London, GB; AN 1982-74156E XP002274521 & SU 876 808 A (Khark Pedagogy Inst) 2. Nov. 2, 1981.

Database CA 'Online! Chemical Abstracts Service, Columbus, Ohio, US; Shtan'ko, V.M. et al: "Effect of anodic polarization on the anodic dissolution of tantalum" XP002274519 gefunden im STN Database accession No. 89:206298 Ca & Voprosy Khimii I Khimicheskoi Tekhnologii (1978), 50, 7-10, 1978.

\* cited by examiner

PROCESS FOR THE PRODUCTION OF SHAPED ARTICLES OF NIOBIUM OR TANTALUM BY ELECTROCHEMICAL ETCHING

CROSS REFERENCE TO RELATED PATENT APPLICATION

The present patent application claims the right of priority under 35 U.S.C. § 119 (a)–(d) of German Patent Application No. 102 59 934.3, filed Dec. 20, 2002.

FIELD OF THE INVENTION

The invention relates to a process for the production of shaped articles of niobium or tantalum by anodic etching of the metals covered with a structured photoresist mask in an aqueous etching solution containing hydrofluoric acid, and shaped articles thus obtainable.

BACKGROUND OF THE INVENTION

In the production of capacitors, anodes based on niobium or tantalum are frequently used. These often consist of specially shaped sheets of said metals to which a paste containing niobium powder or tantalum powder is applied, for example by means of screen printing. The paste is then subjected to a sintering step, with a sintered body which is firmly connected to the shaped article of niobium or tantalum being formed.

The required shaped articles of niobium or tantalum can be etched, for example, out of niobium or tantalum sheets of suitable thickness.

It is known that niobium and tantalum can be etched both by plasma methods and other physical methods and by wet chemical methods. In the physical methods, however, the etching rates are very low. Structures of several 10 µm thickness, as are required for the production of shaped articles, therefore, cannot be produced in acceptable times by these methods. Moreover, the high costs for the equipment and the operation of units, as required for carrying out physical etching methods, may be mentioned as a further disadvantage.

It is therefore economically expedient to use only wet chemical methods for etching shaped articles from niobium or tantalum. Both purely chemical and electrochemical methods are suitable. Before the etching process, a photosensitive resist, a so-called photoresist, is applied to the niobium or tantalum layer to be etched. By suitable exposure to light, the photoresist can then be structured. The photoresist can then be removed, for example by washing out, in the parts where the etching process is to take place, so that the niobium or tantalum layer underneath can come into contact with an etching solution in these parts. The regions of the niobium or tantalum layer in which the photoresist is not removed are protected by this coating from attack by the etching solution.

Methods in which no mask need be produced from a photoresist, such as ECM (electrochemical machining) and the corresponding micro method, EMM (electrochemical micromachining), are also known. In these methods, the selective dissolution in predetermined parts of the workpiece is achieved by the very close approach on an appropriately shaped cathode to the workpiece. In the gap of a few 10 µm thickness between workpiece and cathode, very high current densities and accordingly also high etching rates can be achieved by intensive feeding of the etchant and virtually perpendicular etched edges can be produced. This method, however, requires suitable tools in the form of cathodes, which must be extremely resistant to etching for the application described. The production of such tools, which are manufactured individually from expensive materials, is very costly. This also applies to the required apparatus which generates the necessary intensive flow.

For the electroless wet chemical etching of niobium and tantalum, mixtures of hydrofluoric acid or fluorides with other acids and oxidizing additives, predominantly nitric acid, are generally described. The oxidizing agent has, inter alia, the task of preventing the formation of gaseous hydrogen which can adversely affect the adhesion of a mask comprising a photoresist on the metal.

The metals niobium and tantalum have a dense, firmly adhering, chemically very inert oxide layer and are therefore insoluble in the customary acids, with the exception of hydrofluoric acid. The oxide layer also makes it impossible to establish electrochemical potentials in a reproducible manner, so that very different data are to be found in the literature. However, normal potentials which were estimated from thermodynamic data are in the substantially negative range close to −1 V for niobium and tantalum. These metals can therefore be dissolved purely chemically in hydrofluoric acid without addition of oxidizing agents, but the resulting overvoltage of the hydrogen forming retards the dissolution and hence the chemical etching process.

The chemical etching of niobium and tantalum is as a rule therefore used only when the thickness of the layer to be etched is only a few micrometers. Such thin layers can still be completely etched in an acceptable time. Etching times of a few seconds are sufficient, so that conventional photoresists which are as a rule applied to the niobium or tantalum layers to be etched are not attacked.

U.S. Pat. No. 4,266,008 describes the production of superconducting circuits. For this purpose, a mask of photosensitive material is applied to thin niobium films having a thickness of from 0.5 to 5 µm and the niobium film is then etched in the parts which are not covered with the material, by means of an aqueous etching solution. The etching solution contains from 8.5 to 9% by weight of nitric acid, from 11.5 to 12% by weight of sulphuric acid and from 12.25 to 12.75% by weight of hydrofluoric acid. A 0.5 µm thick niobium layer can be completely etched with this etching solution in 10 s.

JP 56081680 A, too, discloses a process for etching niobium. A mixture of from 5 to 15% by weight of HF, from 2 to 6% by weight of $NH_4F$, from 10 to 20% by weight of HCl and from 3 to 9% by weight of $HNO_3$ is proposed.

M. Köhler in "Ätzverfahren für die Mikrotechnik [Etching methods for microengineering], WILEY-VCH-Verlag, 1998, page 306" describes an etching bath composed of 0.66 mol/l of $(NH_4)_2S_2O_8$, 0.27 mol/l of $NH_4F$, 0.11 mol/l of citric acid and 1.43 mol/l of $HNO_3$. The etching process is carried out at a temperature of 50° C.

In "Metallographisches, keramographisches, plastographisches Ätzen [Metallographic, ceramographic, plastographic etching], Gebr. Borntraeger Verlag, 6th edition, Stuttgart 1994, page 99", G. Petzow provides information on the microetching of niobium and its alloys with an etching solution which contains no fluorine compound. The etching solution consists of a mixture of equal parts of water, 30% strength by weight hydrogen peroxide and 32% strength by weight ammonia solution and is intended to be used at the boiling point. Since such a mixture is stable for only a short time, in particular at the boil, it is not suitable for the production of shaped articles of niobium and tantalum by means of etching.

The two metals niobium and tantalum can be etched not only with hydrofluoric acid but also with strongly alkaline solutions, to which, however, all known photoresists are insufficiently stable. Alkaline etchants are therefore not suitable for chemical machining. Owing to the evident difficulties due to the high acid concentrations and the necessity of adding oxidizing agents, the purely chemical methods for the production of shaped articles of niobium and tantalum are not very promising.

In principle, no oxidizing agents are required in electrochemical etching. Nevertheless, G. Petzow in "Metallographisches, keramographisches, plastographisches Ätzen [Metallographic, ceramographic, plastographic etching], Gebr. Borntraeger Verlag, 6th edition, Stuttgart 1994, page 99" specifies a mixture of 17 parts of 65% strength by weight $HNO_3$, 17 part of 40% strength by weight HF and 66 parts of water for such a process. According to G. Petzow, the etching is effected with from 12 to 30 volt against a Pt cathode. In the electrochemical etching of niobium, no passivation, as occurs in the case of some metals in certain etchants, was described in the case of the anodic dissolution in HF. In the electrochemical etching of tantalum at a current density greater than 1 $A/dm^2$, on the other hand, a layer of $H_2TaF_7$ forms, which layer hinders the further dissolution and increases the bath voltage.

A disadvantage of the wet chemical methods described is the intensive attack by the etching solutions used on the photoresist mask, which prevents destruction of niobium and tantalum layers having a thickness substantially greater than 10 μm. However, shaped articles of a corresponding thickness are required, for example, for the production of niobium or tantalum anodes. A further disadvantage is that single crystallites are exposed with the use of the etching solutions described, which results in a very rough surface in the etched parts.

It is therefore an object of the present invention to provide a process for etching shaped articles of niobium and tantalum which does not have said disadvantages and in particular permits the production of shaped articles having a thickness greater than 50 μm.

SUMMARY OF THE INVENTION

The object is achieved by the electrochemical treatment of niobium and tantalum in an etching solution, the etching solution containing a water-soluble polymer in addition to hydrofluoric acid and special electrochemical conditions being established during the etching.

The invention therefore relates to a process for the production of shaped articles of niobium and tantalum by electrochemical etching of a niobium or tantalum sheet covered with a structured photoresist mask in an aqueous etching solution containing hydrofluoric acid, the etching being effected under electrochemical conditions under which a noise whose mean variation is 5–10% of the absolute etching current is superposed on the resulting etching current and the etching solution containing a water-soluble polymer.

Surprisingly, under these conditions, a substantially uniform etching rate is obtained in all parts not covered by the photoresist mask and a smooth etched surface is produced. The attack by the etchant on the photoresist mask is so small that it withstands the entire etching process without impairment. Etching can therefore be effected without problems over a relatively long period, for example for up to 20 minutes, so that, for example, niobium or tantalum sheets having a thickness of about 70 μm can be completely etched.

According to the invention, the etching solution contains a water-soluble polymer. Here, polymers which are understood as being water-soluble are those which dissolve at least in a concentration of 100 g/l in water at a temperature of 20° C. For example, polyethylene glycol, polyethylene glycol ether and substituted derivatives thereof, such as, for example, Triton®X-100, and polypropylene glycol may be mentioned as suitable water-soluble polymers. A preferably used water-soluble polymer is polyethylene glycol.

DETAILED DESCRIPTION OF THE INVENTION

Figure 1:
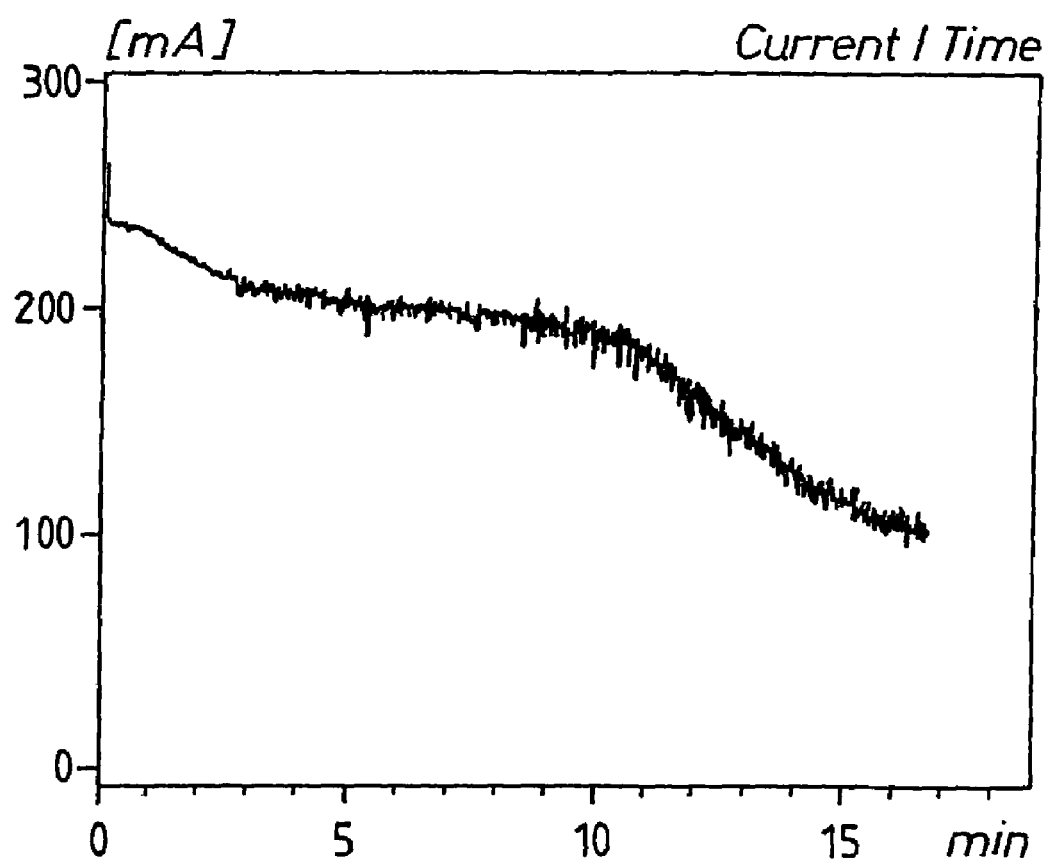
FIG. 1 shows a current-time curve exhibiting an initial settling into the noise of the current, followed by a plateau having a slight slope and a more sharply descending part.

In the process according to the invention, polyethylene glycol having an average molar mass $M_w$ of at least 100 g/mol to the highest available molar masses of about 35 000 g/mol, which still permit solubility in water, can be used. Polyethylene glycols having an average molar mass $M_w$ of from 300 to 1 000 g/mol are preferably used.

The optimal concentration of water-soluble polymer depends both on the average molar mass of the polymer and on the temperature and the further components of the etching solution. The water-soluble polymer is preferably present in the etching solution in a concentration of from 200 to 800 g/l, particularly preferably from 400 to 600 g/l.

The aqueous etching solution used in the process according to the invention contains hydrofluoric acid in a concentration effective for etching. The concentration of hydrofluoric acid in the etching solution is preferably from 100 to 500 g/l, based on pure HF, particularly preferably from 150 to 300 g/l.

Furthermore, ammonium hydrogen fluoride $(NH_4)HF_2$ is advantageously added to the etching solution in a concentration effective for etching. The concentration of ammonium hydrogen fluoride is preferably from 10 to 100 g/l, particularly preferably from 30 to 60 g/l. This permits a longer duration of use of the etching solution with otherwise unchanged etching properties.

An elevated temperature of the etching solution also has an advantageous effect on the etching process. The temperature increase leads to a higher etching rate, which is equivalent to a shorter duration of the process and therefore a shorter time during which the photoresist is subjected to stress. The temperature of the etching solution during etching is therefore preferably from 40 to 60° C., but the etching can also be carried out in the total temperature range from 5 to 70° C.

Agitation of the etching solution by mechanical means, such as, for example, stirring means, or circulation by means of a circulation pump, or by blowing in a gas, increases the etching rate and improves the uniformity of the etching process over the total surface to be etched. The etching solution is therefore preferably agitated by a mechanical means or by blowing in air or a gas which is inert to the niobium or tantalum sheet to be etched and to the etching solution.

Before the etching, a mask comprising a photoresist is applied to the metal to be etched. The conventional, commercially available photoresists may be used. It is advantageous for the adhesion of the mask on the metal if the coating of the metal is carried out by drawing from the liquid resist and, after drying, the mask is cured at elevated temperature.

According to the invention, the etching of niobium and tantalum is effected under electrochemical conditions under which strong noise is superposed on the etching current. The electrochemical potential of the metal to be etched, which is connected as the anode, is chosen, for example, by evaluating test etchings so that, after an initial phase with only little noise, strong noise is superposed on the resulting etching current. A strong noise is to be understood here as meaning a noise of from about 5 to 10% of the absolute etching current.

The electrochemical conditions can be realized, for example, by potentiostatic adjustment of the etching potential or by manual adjustment of the etching current.

The electrochemical potential of the niobium or tantalum sheet to be etched can be adjusted during the etching process by means of a potentiostat against a reference electrode present in the etching vessel close to the surface of the niobium or tantalum sheet.

Advantageously, however, the etching is achieved without direct measurement and regulation of the etching potential using a controllable direct current source which is more economical than the potentiostat. For this purpose, a current-time curve where the etching process takes place optimally is first determined on test substrates by means of a potentiostat and a reference electrode. The current is then regulated by means of a direct current source so that the current-time curve is adapted to the optimum curve determined beforehand.

Preferably, the current-time curve determined is also used for establishing the time when the etching process is stopped. Depending on the etched structure and etching depth achieved, the curve has a characteristic shape, from which the respective desired end state can be recognized on the basis of empirically evaluated curves of test etchings.

Small shaped articles can be economically etched in a relatively large number simultaneously from a niobium or tantalum sheet if the photoresist mask is designed so that the mechanical and electrical connection between the small shaped articles is retained up to the end of etching by narrow photoresist lands in the separating strips and mechanical separation is carried out after the etching.

The niobium or tantalum sheet from which the desired shaped articles are to be etched is preferably immersed in the etching solution so that the strips which are not covered with photoresist, bound the shaped articles and are to be dissolved during the etching are arranged at an angle of 45°±5° to the perpendicular.

In a particular embodiment of the process according to the invention, one or more test fields are applied to the metal to be etched in the photoresist mask, in addition to the structures required for separation. Said test fields can have different partial structures, as also occur in the case of the structures of the shaped articles, for example intersection points, lands or straight strips. The arrangement of the test fields relative to the perpendicular can be varied. In a test series, the conditions for a desired optimum etching result are established and the etched state of the test fields is determined. Subsequent etching processes can then be terminated in a very simple manner at the optimum time as soon as the previously established state of the test field is reached. This can be determined, for example, optically.

The invention furthermore relates to shaped articles of niobium or tantalum, obtainable by the process according to the invention, which differ from mechanically produced shaped articles in their smooth and burr-free edges.

The invention is explained in more detail below with reference to examples, the examples being intended to facilitate understanding of the principle according to the invention and not being intended as a restriction thereof.

EXAMPLES

Example 1

A niobium sheet having a thickness of 70 µm and an area of 100×100 mm$^2$ was provided by a conventional photolithographic process with a 3–4 µm thick mask of the resist XAR P 5900/4 from Allresist GmbH Berlin, the coating being carried out on both sides by drawing the metal sheet at constant velocity out of the liquid resist. Several shaped articles were marked on one side of the metal sheet by 100 µm wide resist-free strips which were arranged at right angles to one another. The strips had 200 µm wide interruptions at intervals of 5 mm, which remained covered by the resist. The mask was cured in a forced-circulation oven at 150° C. for 60 min before the etching.

The etching was effected in a polypropylene vessel resistant to hydrofluoric acid, the niobium sheet with the mask being present in the perpendicular position and at a distance of 2 cm from a platinum electrode of the same size and facing the structured side of this electrode. The strips of the structure which were not covered by the resist and which bounded the individual shaped articles were arranged at an angle of 45° to the perpendicular. The etching vessel contained a mixture of 400 ml of 50% by mass hydrofluoric acid, 600 ml of polyethylene glycol having a molar mass of 400 g/l and 50 g of ammonium hydrogen fluoride $NH_4 \cdot HF_2$. The solution had a temperature of 45° C. A reference electrode resistant to hydrofluoric acid and having an electrochemical potential of 203 mV relative to the normal hydrogen electrode was furthermore present in the etching vessel. The niobium sheet, the platinum electrode and the reference electrode were electrically connected to the outputs of the conventional potentiostat, the niobium sheet being connected as the working electrode. A potential of 1 800 mV relative to the reference electrode was applied to the niobium and the resulting etching current was registered by a conventional means as a function of time. FIG. 1 shows a current-time curve obtained in this manner and exhibiting an initial settling into the noise of the current, followed by a plateau having a slight slope and a more sharply descending part. The latter bends again at the end of the curve shown into a flatter region. The etching was stopped at this point and the mask was washed and dried and then removed with a stripper.

In the strips not covered by the resist, the metal had been etched through to the opposite side with a lateral undercut of 63 µm. The areas formed by etching and laterally bounding the shaped articles had a smooth surface and the edges were crisply formed. The shaped article was separated by breaking the remaining connecting lands.

Example 2

Example 2 corresponds to example 1, the shaped articles having been marked on both sides of the niobium sheet in coincidence in the resist mask and two opposite electrodes which were electrically connected to one another having been used. The duration of etching decreased to half, as did the undercut.

Example 3 (Comparative Example)

The example corresponds to examples 1 and 2, the potential being 1 200 mV relative to the reference electrode. The current-time curve showed no substantial noise and, instead of the drop in the current, a substantial increase occurred after a few minutes. After etching was stopped and the mask removed, the niobium sheet was not etched through to the opposite side, the etched surfaces were very rough and the edges were not crisply formed. Parts which were initially covered by the mask had been extensively attacked by etching.

Example 4

The example corresponds to examples 1 and 2, the niobium sheet having been immersed in the etching vessel so that the resist-free strips were arranged horizontally and perpendicularly. After the etching, the metal had been etched through to the opposite side in the perpendicular strips whereas the horizontal ones still contained metal residues.

Example 5

The example corresponds to example 4, the etching solution having been vigorously mechanically agitated by a stirring means during the etching. In the strips not covered by the resist, the metal had been etched through to the opposite side with a lateral undercut of 60 µm. The areas formed by the etching and laterally bounding the shaped articles had a smooth surface and the edges were crisply formed.

Example 6

The example corresponds to example 4, the etching solution having been vigorously mechanically agitated by blowing in air in the form of fine bubbles during the etching. In the strips not covered by the resist, the metal had been etched through to the opposite side with a lateral undercut of 58 µm. The areas formed by the etching and laterally bounding the shaped articles had a smooth surface and the edges were crisply formed.

Example 7

The example corresponds to examples 1 and 2, a direct current source which was controlled so that the current curve corresponded to that in example 1 having been used instead of the potentiostat. The results corresponded to those of example 1.

Example 8

The example corresponds to example 1, several test fields having different partial structures which also occur in the case of the structures of the shaped articles, such as intersections, lands and straight strips, both at the same dimensions as the shaped articles and in larger or smaller dimensions and formed in a wedge shape with a continuous change of dimensions, were additionally applied to the metal to be etched in the resist mask. Furthermore, the directions of the test structure relative to the perpendicular were varied. In a test series, that etched state of the test field which is associated with the optimum etching result was determined and the etching process was stopped during further etchings at the time when this state of the test field was recognized by optical observation.

Example 9

The example corresponds to example 8, several test structures as described having been used, said structures having been etched simultaneously and in electrical connection with the workpiece to be etched, under otherwise identical conditions to said workpiece, and having been removed from the etching bath for observation. In a test series, that etched state of the test field which is associated with the optimum etching result was determined and the etching process was stopped during further etchings at the time when this state of the test field was recognized by optical observation.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing shaped articles comprising:
   etching electrochemically a sheet selected from the group consisting of niobium sheet and tantalum sheet, said sheet being covered by a structured photoresist mask, the etching being performed in the presence of an aqueous etching solution comprising,
   (i) hydrofluoric acid,
   (ii) a water-soluble polymer, and
   (iii) ammonium hydrogen fluoride in a concentration of from 10 to 100 g/l, wherein the etching is performed with a resulting etching current, and a noise is superposed on said resulting etching current, said noise having a mean variation of 5–10% relative to an absolute etching current.

2. The process of claim 1, wherein the water-soluble polymer is polyethylene glycol having an average molar mass Mw of at least 100 g/mol.

3. The process of claim 1, wherein the aqueous etching solution contains the water-soluble polymer in a concentration of from 200 to 800 g/l.

4. The process of claim 1, wherein the aqueous etching solution contains hydrofluoric acid in a concentration of from 100 to 500 g/l.

5. The process of claim 1, wherein the temperature of the aqueous etching solution during the etching step is from 5 to 70° C.

6. The process of claim 1, wherein the aqueous etching solution is agitated by a method selected from the group consisting of mechanical means and blowing in air or a gas, said gas being inert to both said sheet and the aqueous etching solution.

7. The process of claim 1, wherein said sheet has an electrochemical potential, said electrochemical potential of said sheet being adjusted by means of a potentiostat relative to a reference electrode present in the etching vessel close to the surface of said sheet.

* * * * *